United States Patent [19]

Yamada et al.

[11] Patent Number: 4,616,129
[45] Date of Patent: Oct. 7, 1986

[54] LIGHT DETECTING APPARATUS

[75] Inventors: Junichi Yamada; Kazuo Horikawa; Masaru Noguchi, all of Kanagawa, Japan

[73] Assignee: Fuji Photo Film Co., Ltd., Kanagawa, Japan

[21] Appl. No.: 676,998

[22] Filed: Nov. 30, 1984

[30] Foreign Application Priority Data

Dec. 1, 1983 [JP] Japan .................. 58-227543

[51] Int. Cl.⁴ .............................................. H01J 40/14
[52] U.S. Cl. ............................ 250/207; 250/213 VT; 250/227; 250/327.2
[58] Field of Search ............ 250/207, 213 R, 213 VT, 250/227, 327.2, 366, 484.1

[56] References Cited

U.S. PATENT DOCUMENTS 4,523,091  6/1985  Persyk .................. 250/213 VT
4,568,832  2/1986  Tanaka et al. .......... 250/327.2
4,571,493  2/1986  Horikawa .............. 250/327.2

FOREIGN PATENT DOCUMENTS 0123942  11/1984  Japan .................. 250/327.2

Primary Examiner—Eugene R. LaRoche
Assistant Examiner—James C. Lee
Attorney, Agent, or Firm—Sughrue, Mion, Zinn, Macpeak, and Seas

[57] ABSTRACT

A light detecting apparatus comprises an elongated plate-shaped light guide member having an end face at one long side as a light input face and an end face at the other long side as a light output face. N number of photomultipliers having elongated light receiving faces optically associated with N divisions of the light output face divided into N divisions in the length direction of the light output face of the light guide member are positioned for converting the light emitted from the divisions of the light output face into electric signals. The photomultipliers are connected to a correction circuit for electrically eliminating deterioration in sensitivity at least at adjacent photomultiplier side end portions of the photomultipliers.

7 Claims, 8 Drawing Figures

LIGHT DETECTING APPARATUS

BACKGROUND OF THE INVENTION

1. Field of the Invention

This invention relates to a light detecting apparatus for detecting light carrying information in an image read-out apparatus or the like.

2. Description of the Prior Art

When certain kinds of phosphor are exposed to a radiation such as X-rays, α-rays, β-rays, γ-rays, cathode rays or ultra-violet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet or simply as a sheet) is first exposed to a radiation passing through an object to have a radiation image stored therein, and is then scanned with stimulating rays such as a laser beam which cause it to emit light in the pattern of the stored image. The light emitted by the stimulable phosphor sheet upon stimulation thereof is photoelectrically detected and coverted to an electric image signal, which is processed as desired to reproduce a visible image having an improved quality, particularly a high diagnostic efficiency and accuracy.

FIG. 1 is a schematic view showing an example of a radiation image read-out apparatus employed in the aforesaid radiation image recording and reproducing system.

In the apparatus of FIG. 1, a laser beam 1a of a predetermined intensity is emitted as stimulating rays from a laser beam source 1 to a galvanometer mirror 2. The laser beam 1a is deflected by the galvanometer mirror 2 to form a laser beam 1b impinging upon a stimulable phosphor sheet 3 positioned below the galvanometer mirror 2 so that the sheet 3 is scanned by the laser beam 1b in the main scanning direction, i.e. in the width direction of the sheet 3 as indicated by the arrow A. While the laser beam 1b impinges upon the stimulable phosphor sheet 3, the sheet 3 is conveyed in the sub-scanning direction as indicated by the arrow B, for example, by an endless belt device 9. Therefore, scanning in the main scanning direction is repeated at an angle approximately normal to the sub-scanning direction, and the whole surface of the stimulable phosphor sheet 3 is two-dimensionally scanned by the laser beam 1b. As the stimulable phosphor sheet 3 is scanned by the laser beam 1b, the portion of the sheet 3 exposed to the laser beam 1b emits light having an intensity proportional to the radiation energy stored. The light emitted by the stimulable phosphor sheet 3 enters a transparent light guide member 4 from its light input face 4a positioned close to the sheet 3 in parallel to the main scanning line.

The light guide member 4 is made of a material exhibiting a high light transmittance, such as an acrylic resin, and has a flat-shaped front end portion 4b positioned close to the stimulable phosphor sheet 3 and is shaped gradually into a cylindrical shape towards the rear end side to form an approximately cylindrical rear end portion 4c which is closely contacted with a photomultiplier 5. The light emitted by the stimulable phosphor sheet 3 upon stimulation thereof and entering the light guide member 4 from its light input face 4a is guided inside of the light guide member 4 up to the rear end portion 4c, and received by the photomultiplier 5. Thus the light emitted by the stimulable phosphor sheet 3 in proportion to the radiation energy stored therein is detected and converted into an electric image signal by the photomultiplier 5. The electric image signal thus obtained is sent to an image processing circuit 6 and processed therein. The electric image signal thus processed is then reproduced into a visible image and displayed, for example, on a CRT 7, or stored in a magnetic tape 8, or directly reproduced as a hard copy on a photographic material or the like.

However, when light detection is conducted by use of the light guide member 4 and the photomultiplier 5 as described above, since the light guide member 4 is partially rounded cylindrically, the length from the light input face 4a to the rear end portion 4c of the light guide member 4 becomes long, and therefore the read-out apparatus becomes large. Further, since the distance between the light input face 4a and the photomultiplier 5 is different among various portions of the light guide member 4, the degree of light loss becomes different among various portions of the light guide member 4, and nonuniformity of sensitivity arises. Also, the light guide member 4 having the complicated shape described above is difficult to fabricate.

SUMMARY OF THE INVENTION

The primary object of the present invention is to provide a light detecting apparatus which is free from nonuniformity of sensitivity.

Another object of the present invention is to provide a light detecting apparatus which uses a light guide member having a simple shape and a simple configuration and which is small and is easy to fabricate.

The present invention provides a light detecting apparatus comprising:

(i) an elongated plate-shaped light guide member having an end face at one long side as a light input face and an end face at the other long side as a light output face, (ii) N number of photomultipliers having elongated light receiving faces optically associated with N divisions of said light output face divided into N divisions in the length direction of said light output face of said light guide member, said photomultipliers converting the light emitted from said divisions of said light output face into electric signals, and (iii) a correction circuit for electrically eliminating deterioration in sensitivity at least at adjacent photomultiplier side end portions of said photomultipliers.

Since the light detecting apparatus uses a light guide member having a simple shape and a simple configuration, the apparatus is small in size and is easy to fabricate. Also, since the distance between the light input face of the light guide member and the photomultiplier is uniform, nonuniformity of sensitivity does not arise. Further, partial deterioration in sensitivity is eliminated by the correction circuit. Therefore, the light detecting apparatus of the present invention is very advantageous in practical use.

DESCRIPTION OF THE PREFERRED EMBODIMENTS

The present invention will hereinbelow be described in further detail with reference to the accompanying drawings.

Figure 1:
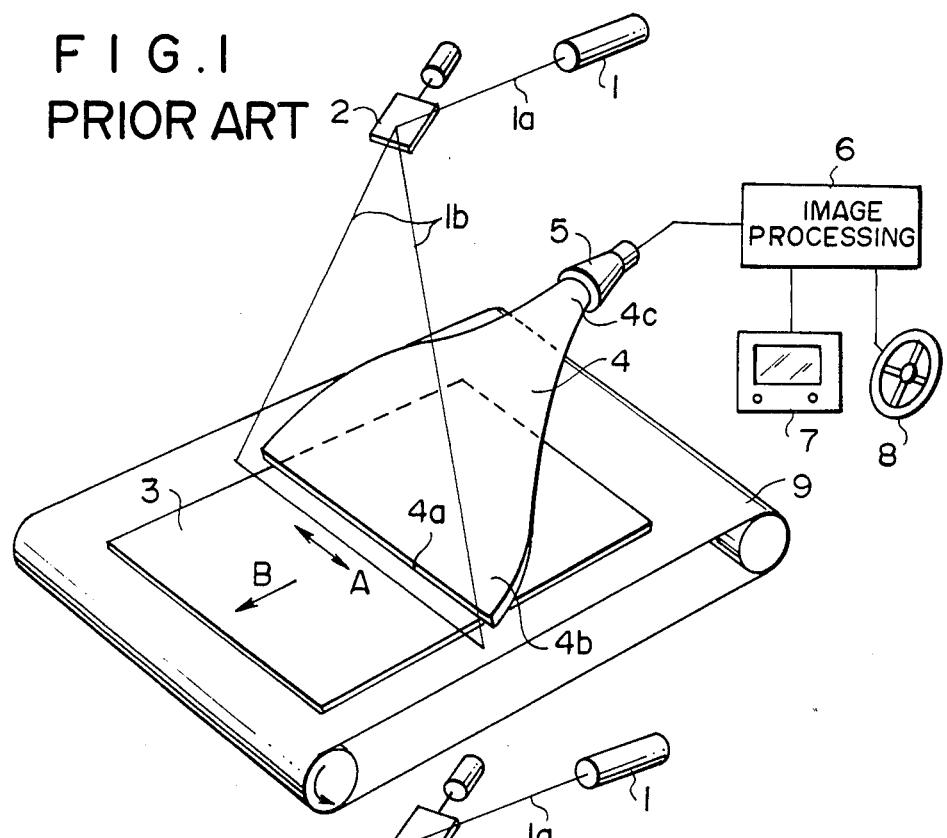
FIG. 1 is a schematic view showing the conventional light detecting apparatus.
Figure 2:
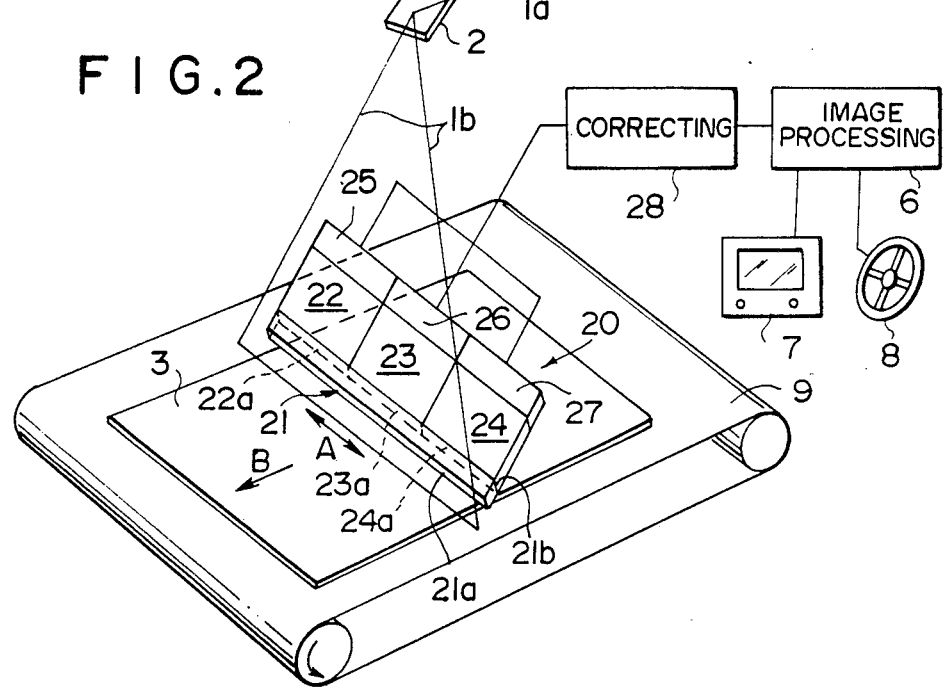
FIG. 2 is a schematic view showing an embodiment of the light detecting apparatus in accordance with the present invention.

FIG. 2 schematically shows an embodiment of the light detecting apparatus in accordance with the present invention. In FIG. 2, similar elements are numbered with the same reference numerals with respect to FIG. 1 (this also applies to the other drawings). A light detecting apparatus 20 comprises an elongated plate-shaped light guide member 21 longer than the width of the stimulable phosphor sheet 3, photomultipliers 22, 23, and 24 closely contacted with the light guide member 21, and pre-amplifiers 25, 26 and 27 connected to the photomultipliers 22, 23, and 24. The light guide member 21 is fabricated of a material exhibiting a high light transmittance, such as an acrylic resin. A front end face (end face at one long side) of the light guide member 21 standing face to face with the stimulable phosphor sheet 3 is formed as a light input face 21a, and a rear end face (end face at the other long side) of the light guide member 21 is formed as a light output face 21b. The photomultipliers 22, 23, and 24 generate electric signals in accordance with the intensities of light entering from light receiving faces 22a, 23a, and 24a thereof. The photomultipliers 22, 23, and 24 are closely contacted with each other, and the light receiving faces 22a, 23a, and 24a are closely contacted with the light output face 21b of the light guide member 21 by adhesion or the like. That is, the whole length of the light output face 21b is covered by the light receiving faces 22a, 23a and 24a.

Outputs of the pre-amplifiers 25, 26, and 27 for amplifying the electric signals generated by the photomultipliers 22, 23, and 24 are sent to the image processing circuit 6 via a correction circuit 28. When the photomultipliers 22, 23, and 24 are positioned side by side as described above, since dead zones are present at end portions of the photomultipliers 22, 23, and 24, deterioration in sensitivity arises at the contact portions between the photomultipliers 22 and 23 and between the photomultipliers 23 and 24. The correction circuit 28 is provided for eliminating the deterioration in sensitivity.

The correction circuit 28 will hereinbelow be described in detail with reference to FIG. 3. When the stimulable phosphor sheet 3 carrying a radiation image stored therein is exposed to the laser beam 1b as stimulating rays, the sheet 3 emits light 1c having an intensity proportional to the radiation energy stored therein. The light 1c emitted by the stimulable phosphor sheet 3 enters the light guide member 21 from the light input face 21a, and is guided inside of the light guide member 21 to the photomultipliers 22, 23, and 24. Outputs of the photomultipliers 22, 23, and 24 amplified by the pre-amplifiers 25, 26, and 27 are added in an adder 30.

The output of the photomultiplier 22 and the output of the photomultiplier 23 are compared with each other by a comparator 31, and the output of the photomultiplier 23 and the output of the photomultiplier 24 are compared with each other by a comparator 32. As shown in FIG. 3, when the laser beam 1b impinges upon the stimulable phosphor sheet 3 on the photomultiplier 22 side with respect to a boundary P1 between the photomultipliers 22 and 23, the amount of the light 1c entering the photomultiplier 22 is larger than the amount of the light 1c entering the photomultiplier 23. At this time, the output of the comparator 31 is at a high level. When the laser beam 1b is scanned in the direction as indicated by the arrow C and passes across the boundary P1, the amount of the light C entering the photomultiplier 23 becomes larger than the amount of the light C entering the photomultiplier 22, and the output of the comparator 31 goes to a low level. The same thing arises with the comparator 32 before and after the laser beam 1b passes across a boundary P2 between the photomultipliers 23 and 24. That is, waveforms of signals 33 and 34 of the comparators 31 and 32 become as shown by graphs (a) and (b) in FIG. 3.

Figure 3:
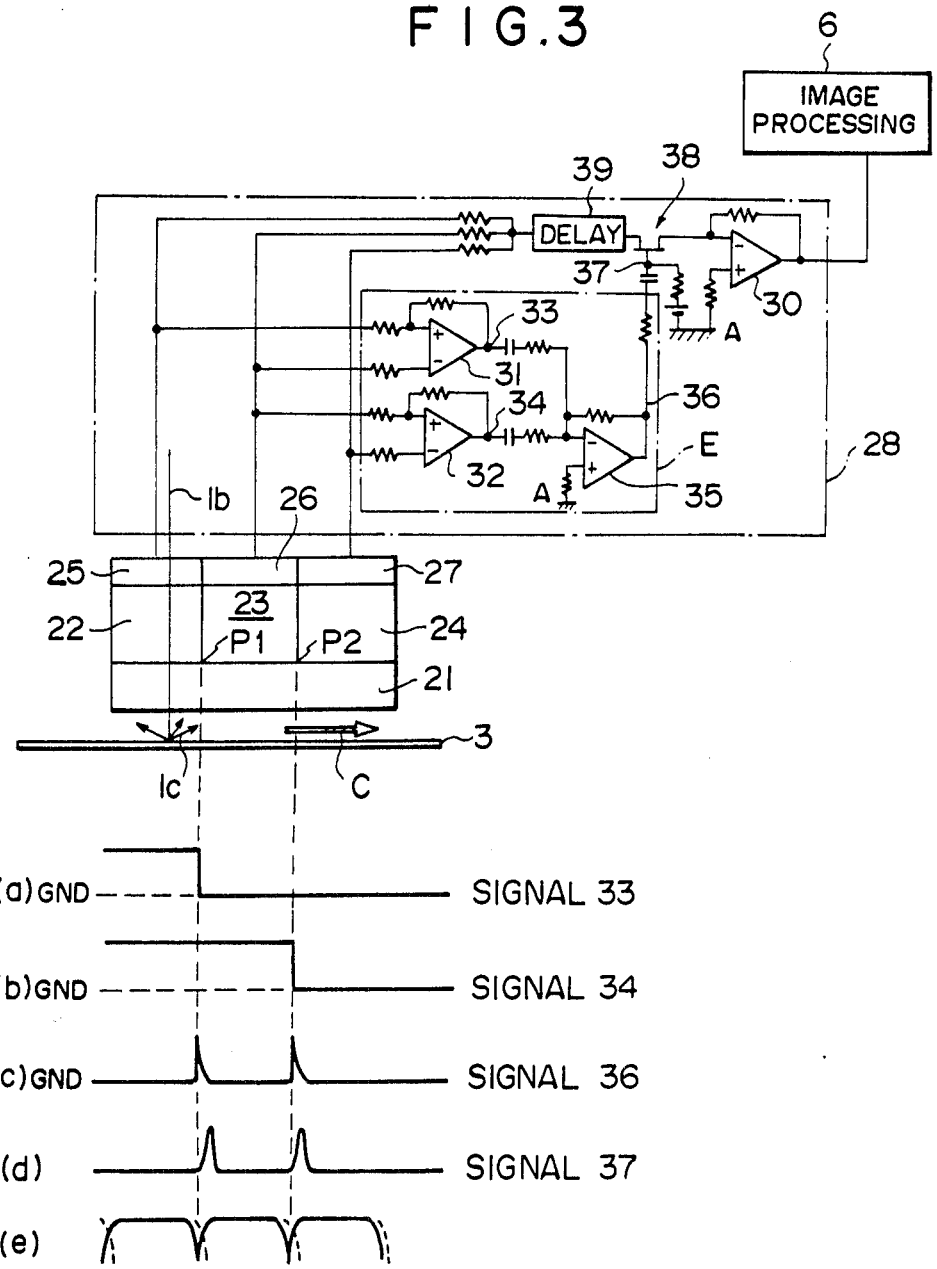
FIG. 3 is a circuit diagram showing the correction circuit in the embodiment of FIG. 2 together with signal waveforms at various sections of the correction circuit.

When the outputs of the comparators 31 and 32 are differentiated and then added by an adder 35, an output signal 36 as shown by a graph (c) in FIG. 3 is obtained as a composite differentiated signal. A signal as shown by a graph (d) in FIG. 3 is obtained by integration of the output signal 36, and the alternating current component of the signal 37 is sent to the gate of a field effect transistor (FET) 38. The gate of the FET 38 is normally biased by a direct current and maintained at a predetermined resistance. When the alternating current component of the signal 37 is sent to the gate, the resistance across the source and the drain of the FET 38 becomes low and, as a result, the degree of amplification of the adder 30 is increased. As described above, at the boundary P1 between the photomultipliers 22 and 23 and at the boundary P2 between the photomultipliers 23 and 24, the sensitivity of the detection system is deteriorated as indicated by the full line in a graph (e) in FIG. 3. The deterioration in sensitivity is electrically eliminated by increasing the degrees of amplification of the pre-amplifiers 25, 26, and 27 at the boundaries P1 and P2 as described above. A delay circuit 39 is positioned between the FET 38 and the pre-amplifiers 25, 26, and 27, and the outputs of the preamplifiers 25, 26, and 27 are delayed so that, as indicated by the broken line in the graph (e) in FIG. 3, the FET gate signal 37 reaches its peak when the photomultiplier sensitivity becomes minimum.

By way of example, the light guide member 21 is fabricated to have a height within the range of approximately 20 mm to approximately 30 mm. The photomultipliers 22, 23, and 24 are fabricated to have an effective width of approximately 75 mm and a thickness of approximately 20 mm.

Figure 4:
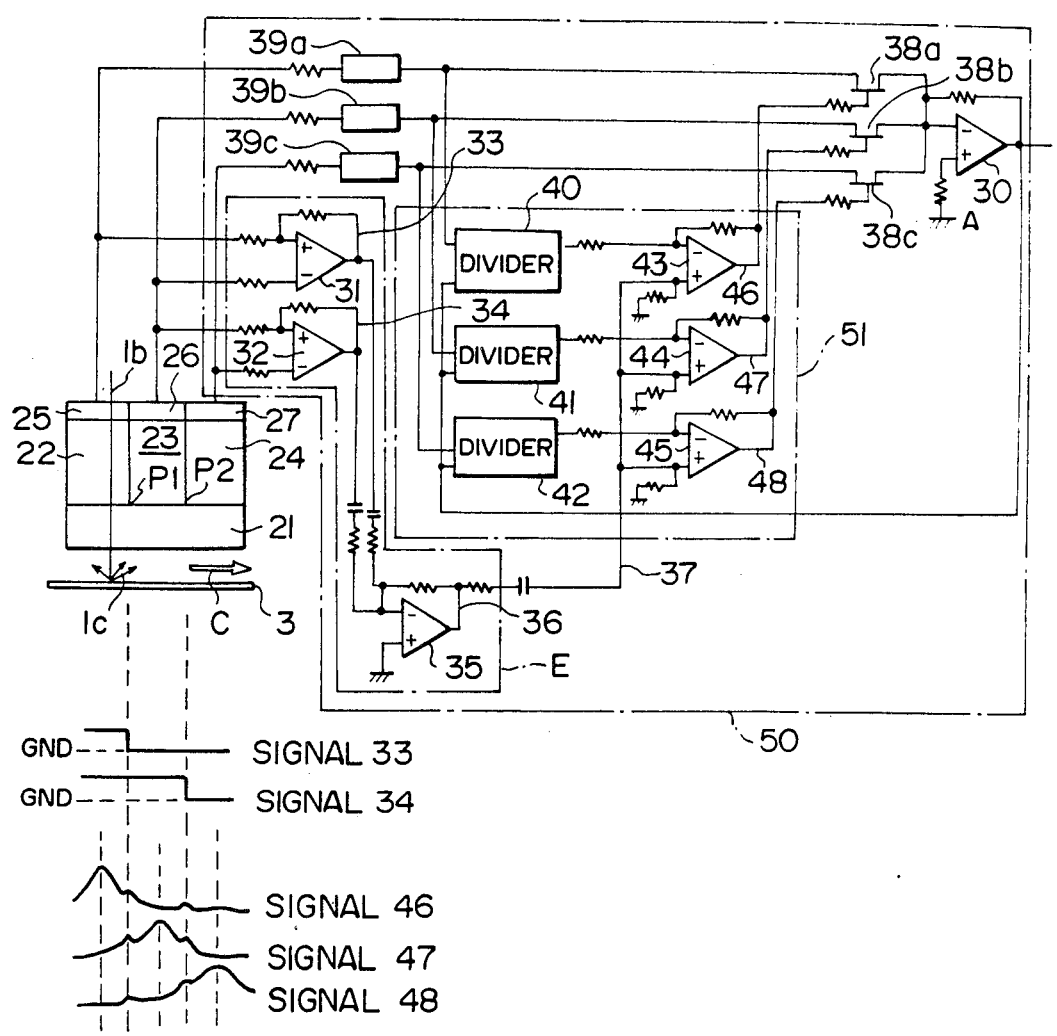
FIG. 4 is a circuit diagram showing the correction circuit in another embodiment of the light detecting apparatus in accordance with the present invention together with signal waveforms at various sections of the correction circuit.

In the aforesaid embodiment, the degrees of amplification of the photomultipliers 22, 23, and 24 are equal to each other. However, by changing the degrees of amplification of a plurality of photomultipliers in accordance with the position of exposure of the stimulable phosphor sheet 3 to stimulating rays, it is possible to improve the S/N ratio. FIG. 4 shows a correction circuit 50 constructed for this purpose. In FIG. 4, similar elements are numbered with the same reference numerals with respect to FIG. 3, and the section indicated by a reference character E is the same as the section indicated by the reference character E in FIG. 3. For example, when the stimulable phosphor sheet 3 is exposed to the laser beam 1b at a position standing face to face with the photomultiplier 22, the solid angles of the light receiving faces of the photomultipliers 22, 23, and 24 covering the light emission point of the sheet 3 decrease in the order of the photomultiplier 22, the photomultiplier 23, and the photomultiplier 24. Therefore, in this case, when the degree of amplification of the output signal of the photomultiplier 22 is maintained larger than that of the output signal of the photomultiplier 23 and when the degree of amplification of the output signal of the photomultiplier 23 is maintained larger than that of the output signal of the photomultiplier 24, the S/N ratio of the output signal of the adder 30 increases.

In the correction circuit 50, in order to adjust the degrees of amplification as described above, the outputs of the pre-amplifiers 25, 26, and 27 are independently sent to FETs 38a, 38b, and 38c via delay circuits 39a, 39b, and 39c, and an amplification degree weighting circuit 51 is provided. In the weighting circuit 51, dividers 40, 41, and 42 divide the outputs of the pre-amplifiers 25, 26, and 27 by the output of the adder 30, and calculate the contribution ratios of the pre-amplifiers 25, 26, and 27 to the whole signal. Voltages corresponding to the contribution ratios and the output 36 of the adder 35 for eliminating deterioration in sensitivity at the boundary P1 between the photomultipliers 22 and 23 and at the boundary P2 between the photomultipliers 23 and 24 are respectively added in adders 43, 44, and 45, and are then sent to gates of the FETs 38a, 38b, and 38c. Accordingly, when the laser beam 1b impinges upon the stimulable phosphor sheet 3 at a position standing face to face with the photomultiplier 22 and the contribution ratio of the output of the photomultiplier 22 is higher than those of the outputs of the photomultipier 23 and 24, the gate voltage of the FET 38a becomes higher than the gate voltages of the FETs 38b and 38c, and the resistance across the source and the drain of the FET 38a decreases. As a result, the degree of amplification of the output signal of the photomultiplier 22 becomes higher than those of the output signals of the photomultipliers 23 and 24. In the same manner, the degree of amplification of the output signal of the photomultiplier 23 becomes higher than that of the output signal of the photomultiplier 24. By weighting the degrees of amplification of the outputs signals of the photomultipliers 22, 23, and 24 as described above, the S/N ratio of the output signal of the correction circuit 50 is improved.

Figure 5:
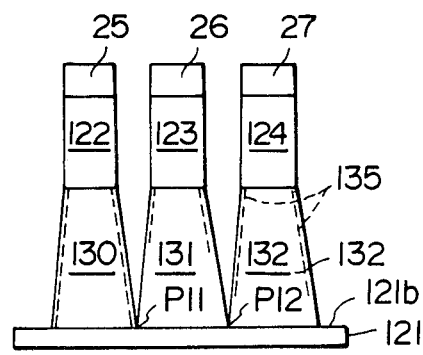
FIG. 5 is a partial front view showing a further embodiment of the light detecting apparatus in accordance with the present invention.

In the aforesaid embodiments, the photomultipliers 22, 23, and 24 are directly contacted with the light output face 21b of the elongated light guide member 21. However, as shown in FIG. 5, it is also possible to optically associate a light output face 121b of an elongated light guide member 121 with photomultipliers 122, 123, and 124 via light guide member pieces 130, 131, and 132. In this case, it becomes possible to minimize deterioration in sensitivity at a boundary P11 between the light guide member pieces 130 and 131 and at a boundary P12 between the light guide member pieces 131 and 132. Also, when the side end faces of the light guide member pieces 130, 131, and 132 are formed as mirror faces 135, 135, . . . , light loss at the light guide member pieces 130, 131, and 132 is minimized.

Figure 6:
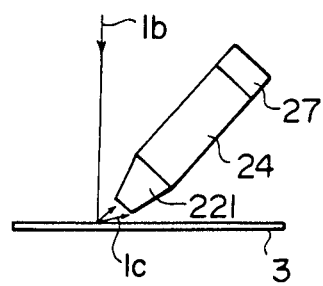
FIGS. 6, 7, and 8 are partial side views showing still further embodiments of the light detecting apparatus in accordance with the present invention.
Figure 7:
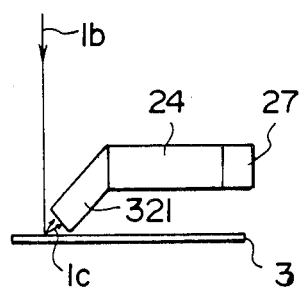
Figure 8:
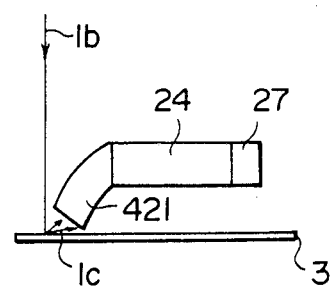

Instead of using the analog circuit as shown in FIG. 3, it is also possible to use a digital circuit for eliminating deterioration in sensitivity. Also, the number of the photomultipliers associated with the light guide member is not limited to three, and the photomultipliers may be used in any number not smaller than two. In the correction circuits of FIGS. 3 and 4, the sensitivity correction points (timing) are adjusted each time the scanning by the laser beam 1b is carried out. However, it is also possible to adjust the sensitivity correction points in advance by defining them by distances from an end portion of scanning in the main scanning direction. Further, instead of fabricating the light guide member in the thin elongated rectangular parallelopiped form, it is also possible to fabricate the light guide member so that the cross-section thereof is in the trapezoid form like light guide members 221 and 321 as shown in FIGS. 6 and 7 or in the bent form like a light guide member 421 as shown in FIG. 8. In this manner, it is possible to modify the layout of the photomultipliers and the pre-amplifiers in various manners within a small installation space.

Though the embodiments of the light detecting apparatus in accordance with the present invention have been described above with respect to application to the radiation image read-out apparatus, the apparatus of the present invention is not limited to the application to the read-out apparatus of this type. Thus the apparatus of the present invention is applicable to detection of light carrying various kinds of information in image read-out apparatuses for reading out the information by exposing a recording material to light and detecting reflected light.

We claim:
1. A light detecting apparatus comprising:
   (i) an elongated plate-shaped light guide member having an end face at one long side as a light input face and an end face at the other long side as a light output face,
   (ii) N number of photomultipliers having elongated light receiving faces optically associated with N divisions of said light output face divided into N divisions in the length direction of said light output face of said light guide member, said photomultipliers converting the light emitted from said divisions of said light output face into electric signals, and
   (iii) a correction circuit for electrically eliminating deterioration in sensitivity at least at adjacent photomultiplier side end portions of said photomultipliers.

2. An apparatus as defined in claim 1 wherein said photomultipliers are directly contacted with said light output face of said light guide member.

3. An apparatus as defined in claim 1 wherein said photomultipliers are optically associated with said light output face of said light guide member via N light guide member pieces.

4. An apparatus as defined in claim 3 wherein side end faces of said light guide member pieces are formed as mirror faces.

5. An apparatus as defined in claim 1 wherein said photomultipliers are connected to N pre-amplifiers for amplifying the electric signals generated by said photomultipliers, and said pre-amplifiers are connected to said correction circuit.

6. An apparatus as defined in claim 5 wherein said correction circuit is constructed so that the degrees of amplification of said pre-amplifiers are increased when deterioration in sensitivity arises at least at adjacent photomultiplier side end portions of said photomultiplier.

7. An apparatus as defined in claim 5 wherein said correction circuit is constructed so that the degrees of amplification of the output signals of said photomultipliers are weighted in accordance with the position of said light emitted from said divisions of said light output face.

* * * * *